United States Patent
Boddu et al.

(10) Patent No.: US 11,526,874 B2
(45) Date of Patent: Dec. 13, 2022

(54) OFFLINE VALUE TRANSFER USING ASYMMETRIC CRYPTOGRAPHY

(71) Applicant: Seagate Technology LLC, Fremont, CA (US)

(72) Inventors: Varun Reddy Boddu, Singapore (SG); Kian Beng Lim, Singapore (SG); Hamza JelJeli, Singapore (SG); Vipin Singh Sehrawat, Fremont, CA (US)

(73) Assignee: Seagate Technology LLC, Fremont, CA (US)

(*) Notice: Subject to any disclaimer, the term of this patent is extended or adjusted under 35 U.S.C. 154(b) by 364 days.

(21) Appl. No.: 16/898,977

(22) Filed: Jun. 11, 2020

(65) Prior Publication Data
US 2021/0390532 A1    Dec. 16, 2021

(51) Int. Cl.
*G06Q 20/36*    (2012.01)
*G06Q 20/06*    (2012.01)
*G06Q 20/38*    (2012.01)

(52) U.S. Cl.
CPC ..... *G06Q 20/3676* (2013.01); *G06Q 20/0658* (2013.01); *G06Q 20/3674* (2013.01); *G06Q 20/3678* (2013.01); *G06Q 20/3829* (2013.01)

(58) Field of Classification Search
CPC ........... G06Q 20/3676; G06Q 20/0658; G06Q 20/3674; G06Q 20/3678; G06Q 20/3829
USPC ...................................................... 705/68
See application file for complete search history.

(56) References Cited

U.S. PATENT DOCUMENTS

| | | | | |
|---|---|---|---|---|
| 9,183,490 | B2* | 11/2015 | Moreton | G06K 19/0727 |
| 9,978,062 | B2* | 5/2018 | Raj | G06Q 20/385 |
| 10,505,726 | B1* | 12/2019 | Andon | G06F 7/588 |
| 11,018,724 | B2* | 5/2021 | Xie | G06Q 20/40 |
| 11,250,391 | B2* | 2/2022 | Sabba | G06Q 20/0457 |
| 2003/0200162 | A1 | 10/2003 | Challener | |
| 2007/0255653 | A1 | 11/2007 | Tumminaro et al. | |
| 2017/0011394 | A1 | 1/2017 | Kumar et al. | |
| 2018/0034642 | A1* | 2/2018 | Kaehler | H04L 63/1483 |
| 2019/0095907 | A1* | 3/2019 | Govindarajan | G06Q 20/382 |

FOREIGN PATENT DOCUMENTS

| | | |
|---|---|---|
| CA | 3044991 A1 * | 12/2019 |
| WO | 2012/123394 | 9/2012 |

OTHER PUBLICATIONS

"EMV Payment Tokenization Primer and Lessons Learned", US Payments Forum, Jun. 2019, 43 pages (Year: 2019).*

(Continued)

*Primary Examiner* — James D Nigh
(74) *Attorney, Agent, or Firm* — Mueting Raasch Group

(57) ABSTRACT

Tokenized assets with associated value are transferred from a designated server to a mobile device. The associated value is removed from the designated server. The tokenized assets are transferred to a first trusted electronic device. The first trusted electronic device is associated with the mobile device. At least a portion of the tokenized assets are transferred to a second trusted electronic device such that the portion of the tokenized assets are only stored on the second trusted electronic device after the transfer. The second electronic device is associated with a second mobile device. The transfer occurs at a time when both the mobile device and the electronic device are offline.

20 Claims, 6 Drawing Sheets

(56) References Cited

OTHER PUBLICATIONS

Kagan ("Everything You Need to Know About the Ledger Nano S Hardware Wallet", Jul. 30, 2018, 7 pages) (Year: 2018).*
BitcoinShirt ("KeepKey Hardware Wallet Review and Guide", Mar. 2, 2018, 29 pages) (Year: 2018).*
"NGRAVE—A Breakthrough Solution In Blockchain & Crypto Security" Oct. 15, 2019, 17 pages (Year: 2019).*

* cited by examiner

OFFLINE VALUE TRANSFER USING ASYMMETRIC CRYPTOGRAPHY

SUMMARY

Embodiments described herein involve a method comprising transferring tokenized assets with associated value from a designated server to a mobile device. The associated value is removed from the designated server. The tokenized assets are transferred to a first trusted electronic device. The first trusted electronic device is associated with the mobile device. At least a portion of the tokenized assets are transferred to a second trusted electronic device such that the portion of the tokenized assets are only stored on the second trusted electronic device after the transfer. The second electronic device is associated with a second mobile device. The transfer occurs at a time when both the mobile device and the electronic device are offline.

Embodiments described herein involve a system comprising one or more processors and one or more storage devices storing computer program instructions which when executed by the one or more processors cause the one or more processors to perform operations. The operations comprise transferring tokenized assets with associated value from a designated server to a mobile device. The associated value is removed from the designated server. The tokenized assets are transferred to a first trusted electronic device. The first trusted electronic device is associated with the mobile device. At least a portion of the tokenized assets are transferred to a second trusted electronic device such that the portion of the tokenized assets are only stored on the second trusted electronic device after the transfer. The second electronic device is associated with a second mobile device. The transfer occurs at a time when both the mobile device and the electronic device are offline.

Embodiments described herein involve a system comprising a first trusted electronic device and a second trusted electronic device. The first trusted electronic device comprises a receiver configured to receive tokenized assets with associated value at a mobile device from a designated server to a mobile device. After the tokenized asset is received, the value quantity is removed from the server. The first trusted electronic device comprises a transmitter configured to transmit at least a portion of the tokenized assets to the second trusted electronic device such that the portion of the tokenized assets is only stored on the second trusted electronic device after the transfer. The transfer occurs at a time when both first trusted electronic device and the second trusted electronic device are offline.

The above summary is not intended to describe each embodiment or every implementation of the present disclosure. A more complete understanding will become apparent and appreciated by referring to the following detailed description and claims taken in conjunction with the accompanying drawings. In other words, these and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
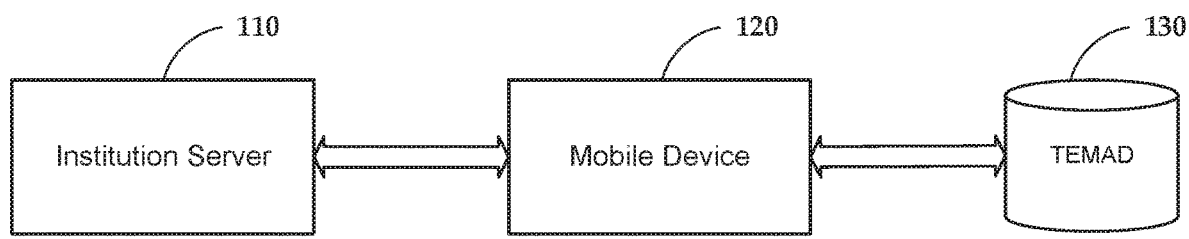
FIG. 1 shows a relationship between the server and the trusted electronic device in accordance with embodiments described herein.

There is a broad terrain on earth that does not have internet coverage. In a situation where there is a lack of internet connection for a considerable amount of time, liquid cash or physical assets is the only alternative to enable a peer to peer transaction. The majority of transactions onboard between seafarers are through fiat.

Embodiments described herein eliminate the necessity to connect to the internet for transactions. While the shipping industry is used to describe a situation with a lack of internet connection for an extended period of time, it is to be understood that embodiments described herein may be used in any industry and/or situation where there may be a concern about internet connectivity. Similarly, embodiments described herein may also be used at a time in which internet access is available.

A virtual wallet that stores the information of the user credit or debit cards or has a feature to upload money to its account (attached to the user's unique attribute example phone number etc.) from a bank. This account is used for payments at Point of Sale (PoS) and peer to peer money transfer. Near field communication (NFC) is a contactless payment mode between the readers and devices (eWallets, EMV devices etc.). NFC devices must share a spatial range of fewer than 2 inches. NFC payments are secure and encrypted. Generally, using mobile wallets to make payments to another peer and/or to a PoS requires an authentication process either during the time or after the transaction. Thus, even if the immediate transaction is offline, the process still requires an online authentication process after the transaction has taken place and therefore is not truly offline.

Embodiments described herein involve a truly offline payment system. Asset values are consolidated, quantified and stored in a digital form in a server. This server can belong to any institution i.e. Banks, Financial Institutions, Multi National Companies and Government institutions, etc. According to embodiments described herein, peers associated with a particular institution are equipped with a low cost trusted electronic mobile accessory device (TEMAD). The TEMAD may be a trusted tamper-proof device, for example. The TEMAD serves as a trusted hardware device where digital value tokens are downloaded from the server. According to various configurations, the TEMAD is a mobile accessory device that can be plugged in and/or otherwise connected to an associated mobile device for a value transfer.

As used herein, an "account identifier" can refer to any information that identifies an account that holds value for a user. An account identifier can be represented as a sequence of characters or symbols. An account identifier is typically provided as part of a transaction, such as a payment transaction, that credits value to the account, debits value to the account, or performs any other suitable action on the account. Credit card numbers, checking and saving account numbers, prepaid account numbers, aliases and/or a passwords, phone numbers, and any other suitable identifier are all examples of account identifiers.

As used herein, a "token" can refer to the result of transforming an account identifier into a form that is not considered sensitive in the context of the environment in which the account token resides. A "tokenization process" can refer to the sequence of steps used to transform an account identifier into an account token.

As used herein, a "key" can refer to any piece of information that is used as a parameter of a tokenization algorithm. The token derivation key can be used to vary the output of a tokenization algorithm. In some embodiments, the key, i.e., public key, is asymmetric as the token derivation key used to tokenize an account identifier is not used in the reverse tokenization algorithm. Instead, a second token derivation key is used in the reverse tokenization. In some cases, the key is symmetric meaning that the same key is used for both tokenization and reverse tokenization. While embodiments described herein involve a system using an asymmetric key, it is to be understood that all or parts of the processes described herein may be used in conjunction with a symmetric key system.

FIG. 1 shows a relationship between the server and the TEMAD in accordance with embodiments described herein. The asset values are transferred to a mobile device 120 from the server 110. The mobile device may include any type of mobile device such as a mobile phone and/or a tablet, for example. The mobile device then transfers the asset values to the TEMAD 130 associated with the mobile device 120 and the server 110. According to various configurations, once the value is transferred to the mobile device from the server, the server does not maintain any trace of the transferred value. Thus, if the mobile device and/or the TEMAD 130 associated with the mobile device is lost or stolen, the value stored on the TEMAD 130 is also lost and cannot be retrieved.

According to various embodiments, the TEMAD device is a trusted device with secure and restrictive policies implemented on its interface and hardware components. According to some configurations, the TEMAD is tamper proof. For example, all of the I/O interfaces of the TEMAD may be strictly secured. The TEMAD may be tightly paired with the associated mobile device such that it cannot be used with other mobile devices. The TEMAD may ensure that there are no duplication of tokens.

Figure 2:
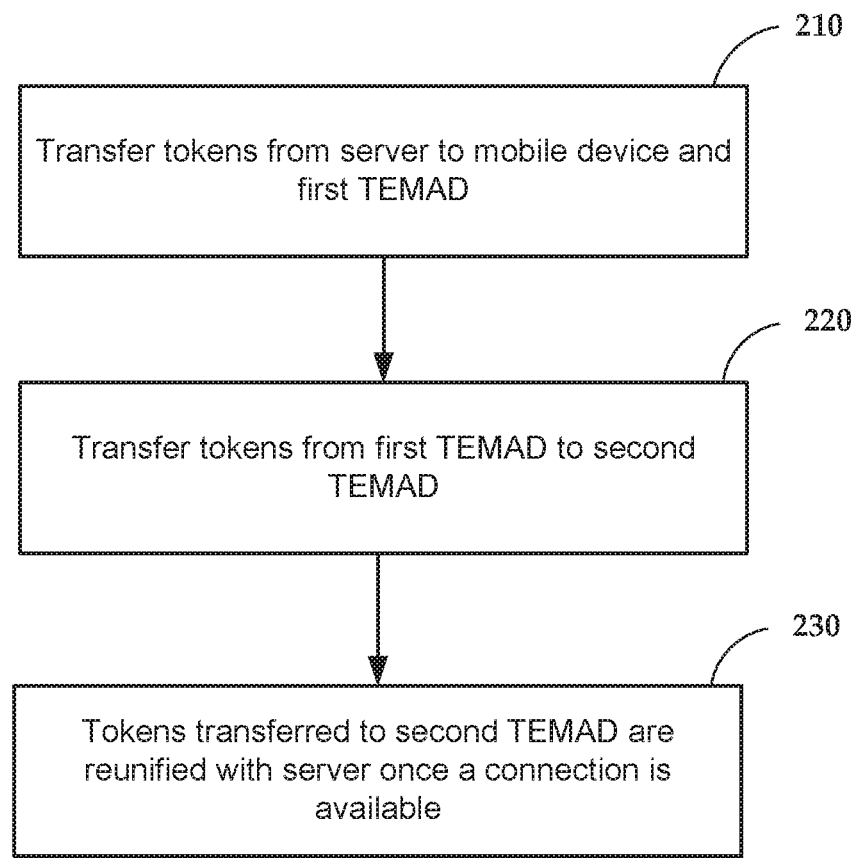
FIG. 2 illustrates a general process for offline value transfer in accordance with embodiments described herein.

FIG. 2 illustrates a general process for offline value transfer in accordance with embodiments described herein. Asset values are transferred 210 from a server that is associated with a first mobile device and then transferred to the first TEMAD. The asset values are stored on the first TEMAD until a time of a transaction.

When a user of the first TEMAD wants to make a payment, at least a portion of the asset values stored on the first TEMAD are transferred 220 to a second TEMAD associated with the payee. It is to be understood that after the asset values are transferred from the server, the asset values are only stored on one of the TEMADs. During the transaction process, the portion of the asset values that are to be paid to the payee, are only stored on the first TEMAD before the transaction and are transferred to the second TEMAD after the transaction.

When an internet connection is available after the transaction has taken place, the payee may choose to reunite 230 the asset values stored on the second TEMAD with the server associated with the second TEMAD. After the asset values are reunited with the server associated with the second TEMAD, the asset values are removed from the second TEMAD. According to various configurations, the institution associated with the first TEMAD and the server associated with the second TEMAD are different. In some cases, the institution associated with the first TEMAD and the institution associated with the second TEMAD are the same.

Figure 3:
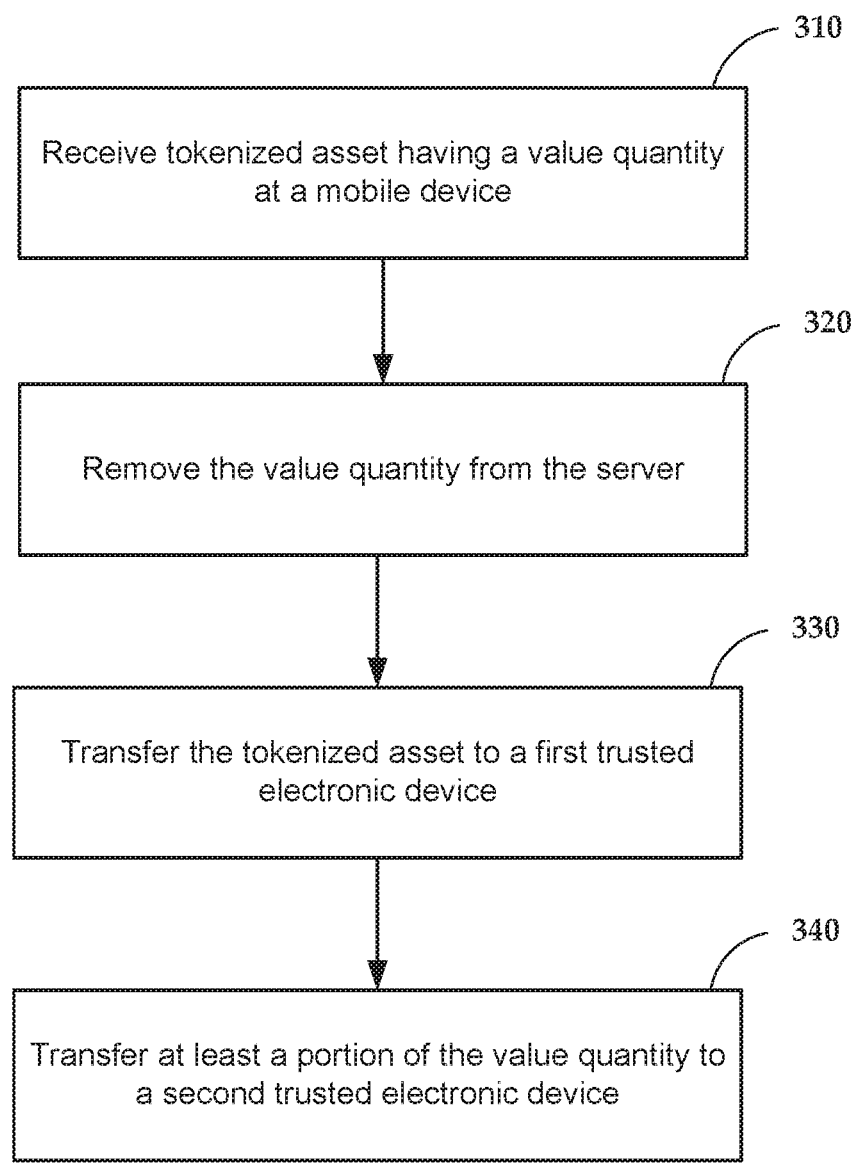
FIG. 3 shows a more detailed process for offline value transfer in accordance with embodiments described herein.

FIG. 3 shows a more detailed process for offline value transfer in accordance with embodiments described herein. Tokenized assets having an associated value are received 310 at a mobile device from a server. According to various configurations, the tokenized values are transferred to the mobile device at a time when the mobile device is connected to the internet.

The tokenized assets are tightly paired with the trusted device. Hence the tokenized assets can only be attached to either the trusted electronic device or the central server. Therefore, after the tokenized asset has been received by the mobile device, any trace of the tokenized assets and the associated value quantity are removed 320 from the server. Thus, if the mobile device and/or the TEMAD is lost, the tokenized asset and the quantity associated with it is lost.

The tokenized assets are transferred 330 to a first trusted electronic device from the first mobile device. According to various configurations, the first trusted electronic device is associated with the mobile device and/or the institution server. The tokenized assets may be transferred 330 from the mobile device to the first trusted electronic device via any compatible wired connection. For example, the tokenized assets may be transferred to the first trusted electronic device using USB-C. In some cases, the tokenized assets may be transferred from the mobile device to the first trusted electronic device wirelessly.

At least a portion of the tokenized assets are transferred 340 to a second trusted electronic device that is associated with an electronic device. According to various configurations, the electronic device may be a second mobile device. This may be the case in the event that the transfer is a peer-to-peer transfer, for example. In some cases, the electronic device is not a mobile device. The portion of the tokenized assets is only stored on the second trusted electronic device after the transfer. According to various configurations, the transfer occurs at a time when both the mobile device and the electronic device are offline. The transfer does not depend on an authentication process with either of the servers associated with the trusted electronic devices during or after the transactions.

According to various embodiments, there are interface restrictions imposed to establish a trusted device to device handshake before the value transfer is invoked. This eliminates the occurrence of duplicate copies of the value tokens. According to various embodiments, the interface between the first trusted electronic device and the second trusted device is secured with end to end encryption. In some cases, a strict policy of transfer is imposed. For example, there may be no copy over function so that there are no duplicates.

Figure 4:
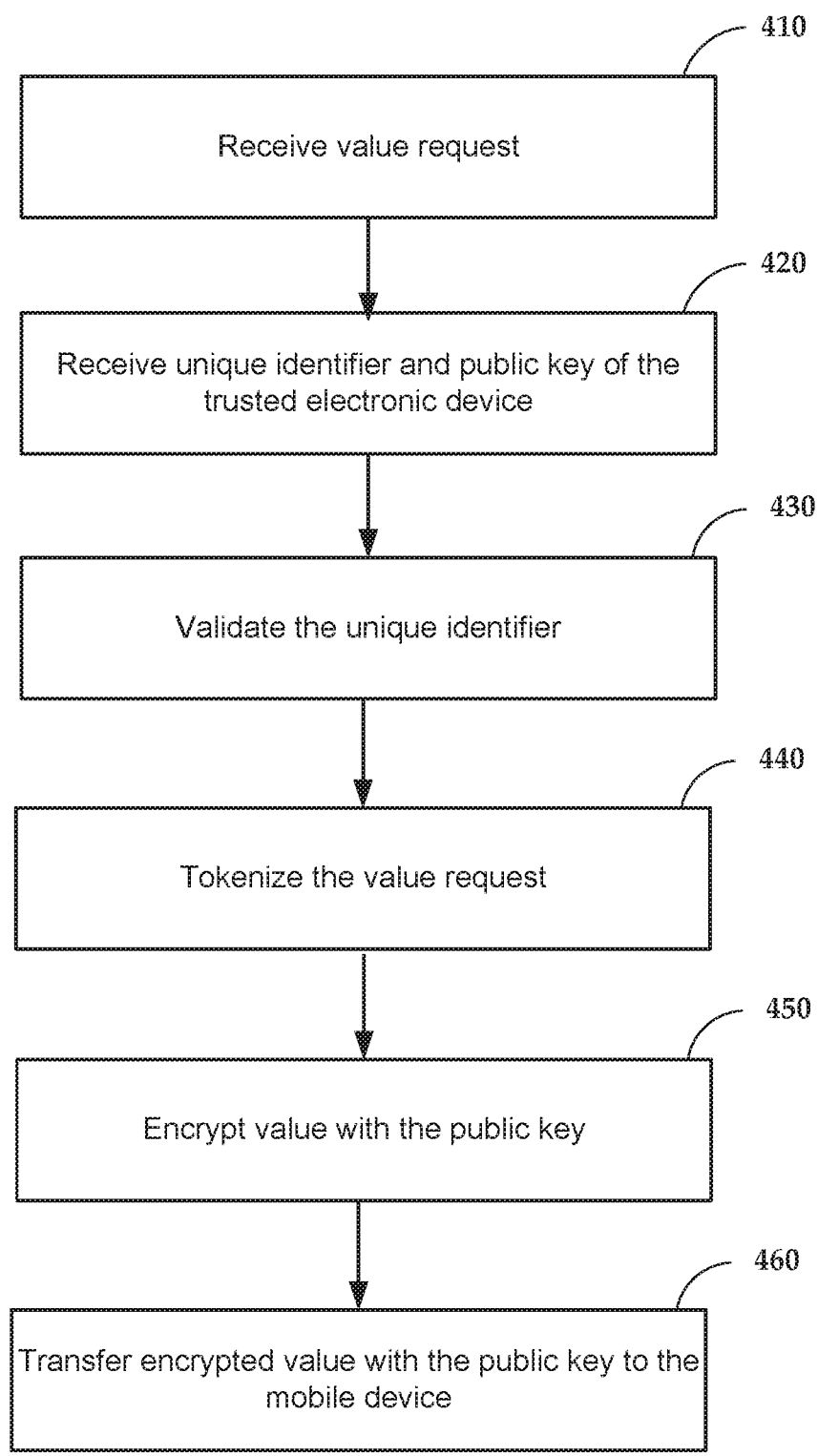
FIG. 4 shows a more detailed process for the transfer of digital value between the server and the mobile device in accordance with embodiments described herein.

FIG. 4 shows a more detailed process for the transfer of digital value between the server and the mobile device and/or the first trusted electronic device in accordance with embodiments described herein. A value request is received 410 at a server from a mobile device as a time when the mobile device is connected to the internet.

The server receives 420 the unique identifier and public key information of from the trusted electronic device associated with the mobile device. The unique identifier may include an account identifier of the mobile device owner that is associated with the first trusted electronic device, for example. The public key may be used to encrypt the value being sent. The server may then validate 430 the unique identifier.

The value request is tokenized 440 by the server via a tokenization process. The requested value is encrypted 450 with the public key. The encrypted value with the public key is transferred 460 to the mobile device and removed from the server. After the transfer of the public key and the requested value, the requested value may be transferred to the first trusted electronic device. According to various embodiments, once the requested tokenized value is transferred to the mobile device and the first trusted electronic device, the server does not retain any copies of the tokenized value.

Figure 5:
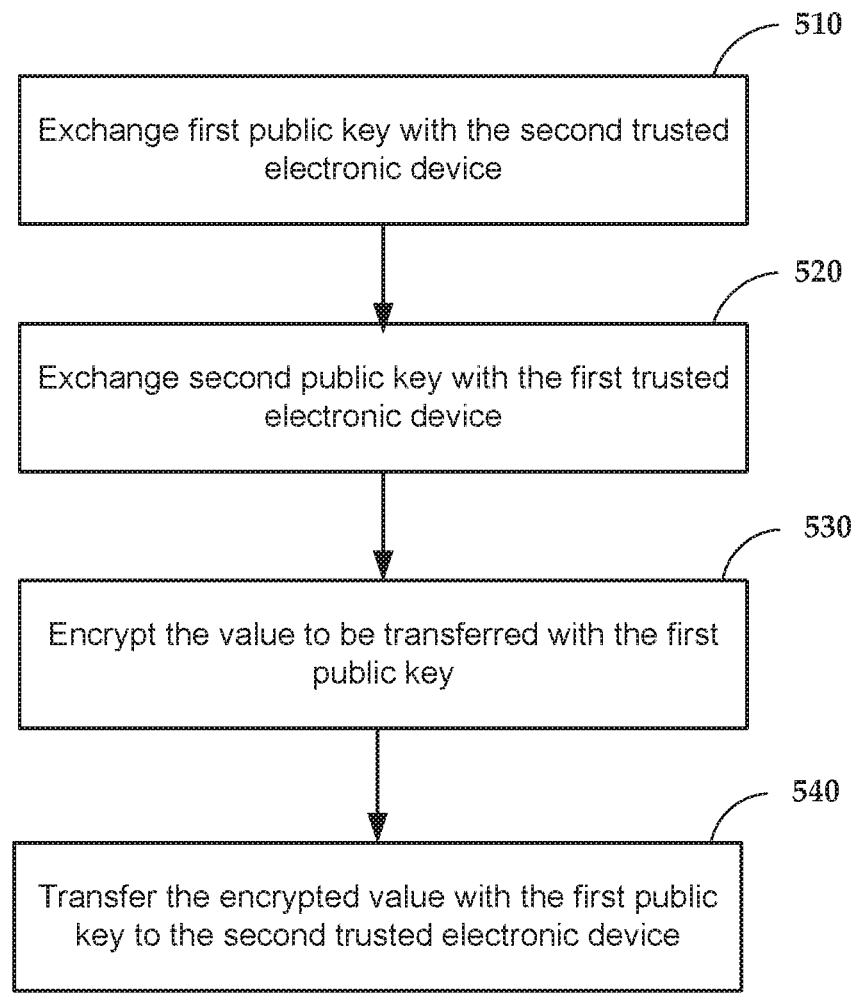
FIG. 5 shows a more detailed offline process for transferring value between a first trusted electronic device and a second trusted electronic device in accordance with embodiments described herein and FIG. 6 shows a block diagram of a system capable of implementing embodiments described herein.

FIG. 5 shows a more detailed offline process for transferring value between a first trusted electronic device and a second trusted electronic device in accordance with embodiments described herein. An asymmetric key exchange is initiated between the first trusted electronic device and the second trusted electronic device. According to various embodiments, the first trusted electronic device initiates the transfer by sending value.

The first trusted electronic device exchanges 510 first public key information with the second trusted electronic device. Similarly, the second trusted electronic device exchanges 520 the second public key with the first trusted electronic device. The tokenized value to be transferred from the first trusted electronic device to the second trusted electronic device is encrypted 530 with the second public key information.

The encrypted value is transferred 540 to the second trusted electronic device utilizing any near field data transfer technologies such as NFC, Bluetooth, Wi-Fi etc. In some cases, the value may be transferred using a wired connection. After transfer of the encrypted value, the transferred value is no longer stored on the first trusted electronic device.

According to various embodiments, once all the transactions are complete and there is an established network connection. One or both of the peers can sync the transactions to the server and transfer the remaining token value from the respective trusted electronic devices to the respective organization servers. According to various embodiments, only the remaining value on the respective trusted electronic devices are uploaded to the respective servers. In some cases, the server never receives a log of the transactions that were completed while the trusted electronic devices were offline.

Figure 6:
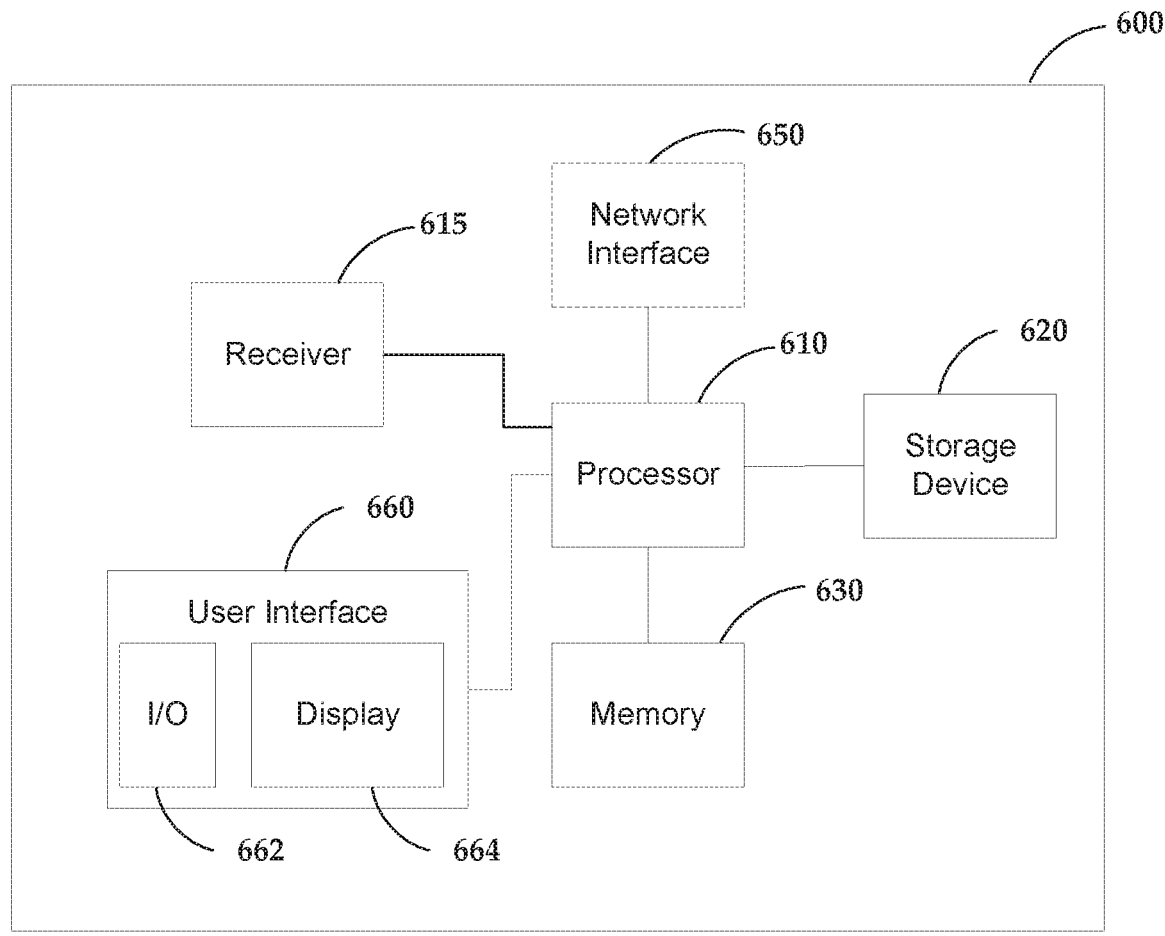

The above-described methods can be implemented on one or more computers using well-known computer processors, memory units, storage devices, computer software, and other components. A high-level block diagram of such a computer that may be used in conjunction with the server, mobile device, and/or the first or second TEMAD is illustrated in FIG. 6. Computer 600 contains a processor 610, which controls the overall operation of the computer 600 by executing computer program instructions which define such operation. It is to be understood that the processor 610 can include any type of device capable of executing instructions. For example, the processor 610 may include one or more of a central processing unit (CPU), a graphical processing unit (GPU), a field-programmable gate array (FPGA), and an application-specific integrated circuit (ASIC). The computer program instructions may be stored in a storage device 620 and loaded into memory 630 when execution of the computer program instructions is desired. Thus, the steps of the methods described herein may be defined by the computer program instructions stored in the memory 630 and controlled by the processor 610 executing the computer program instructions. The computer 600 may include one or more network interfaces 650 for communicating with other devices via a network. The computer 600 also includes a user interface 660 that enables user interaction with the computer 600. The user interface 660 may include I/O devices 1762 (e.g., keyboard, mouse, speakers, buttons, etc.) to allow the user to interact with the computer. Such input/output devices 662 may be used in conjunction with a set of computer programs in accordance with embodiments described herein. The user interface also includes a display 664. According to various embodiments, FIG. 6 is a high-level representation of possible components of a computer for illustrative purposes and the computer may contain other components.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All references and publications cited herein are expressly incorporated herein by reference in their entirety for all purposes, except to the extent any aspect directly contradicts this disclosure.

All scientific and technical terms used herein have meanings commonly used in the art unless otherwise specified. The definitions provided herein are to facilitate understanding of certain terms used frequently herein and are not meant to limit the scope of the present disclosure.

The terms "coupled" or "connected" refer to elements being attached to each other either directly (in direct contact with each other) or indirectly (having one or more elements between and attaching the two elements). Either term may be replaced to "couplable" or "connectable" to describe that the elements are configured to be coupled or connected. In addition, either term may be modified by "operatively" and "operably," which may be used interchangeably, to describe that the coupling or connection is configured to allow the components to interact to carry out functionality.

As used herein, the term "configured to" may be used interchangeably with the terms "adapted to" or "structured to" unless the content of this disclosure clearly dictates otherwise.

The singular forms "a," "an," and "the" encompass embodiments having plural referents unless its context clearly dictates otherwise.

The term "or" is generally employed in its inclusive sense, for example, to mean "and/or" unless the context clearly dictates otherwise. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

What is claimed is:

1. A method, comprising:
   transferring tokenized assets with associated value from a designated server to a mobile device;
   removing the associated value from the designated server;
   transferring the tokenized assets to a first trusted electronic device, the first trusted electronic device associated with the mobile device; and
   transferring at least a portion of the tokenized assets to a second trusted electronic device such that the portion of the tokenized assets are only stored on the second trusted electronic device after the transfer, the second electronic device associated with a second mobile device, wherein the transfer occurs at a time when both the mobile device and the electronic device are offline.

2. The method of claim 1, further comprising encrypting a unique identifier and a public key of the first trusted electronic device.

3. The method of claim 1, further comprising:
   exchanging a unique identifier and a public key of the first trusted electronic device; and
   validating the unique identifier prior to receiving the tokenized assets.

4. The method of claim 1, further wherein transferring at least the portion of the tokenized assets to the second trusted electronic device comprises transferring at least the portion of the tokenized assets to the second trusted electronic device using an asymmetric key exchange.

5. The method of claim 4, wherein the asymmetric key exchange comprises:
   exchanging a public key associated with the first trusted electronic device with the second trusted electronic device; and
   exchanging a public key associated with the second trusted electronic device with the first trusted electronic device.

6. The method of claim 5, wherein transferring at least the portion of the value quantity to the second trusted electronic device comprises:
   encrypting at least the portion of the tokenized assets with the public key associated with the second trusted electronic device; and
   transferring the encrypted at least the portion of the tokenized assets with the public key associated with the second trusted electronic device to the second trusted electronic device.

7. The method of claim 1, further comprising:
   determining that an interact connection is available; and
   syncing a value remaining on the first trusted electronic device with the server.

8. The method of claim 1, wherein the at least a portion of the tokenized assets is transferred to the second trusted electronic device using near field data transfer.

9. The method of claim 1, wherein the tokenized assets are transferred to the first trusted electronic device via a wired connection.

10. A system, comprising:
    one or more processors; and
    one or more storage devices storing computer program instructions which when executed by the one or more processors cause the one or more processors to perform operations comprising:
    transferring tokenized assets with associated value from a designated server to a mobile device;
    removing the associated value from the designated server;
    transferring the tokenized assets to a first trusted electronic device, the first trusted electronic device associated with the mobile device; and
    transferring at least a portion of the tokenized assets to a second trusted electronic device such that the portion of the tokenized assets are only stored on the second trusted electronic device after the transfer, the second electronic device associated with a second mobile device, wherein the transfer occurs at a time when both the mobile device and the electronic device are offline.

11. The system of claim 10, further comprising encrypting a unique identifier and a public key of the first trusted electronic device.

12. The system of claim 10, further comprising:
    exchanging a unique identifier and a public key of the first trusted electronic device; and
    validating the unique identifier prior to receiving the tokenized asset.

13. The system of claim 10, further wherein transferring at least the portion of the tokenized assets to the second trusted electronic device comprises transferring at least the portion of the tokenized assets to the second trusted electronic device using an asymmetric key exchange.

14. The system of claim 13, wherein the asymmetric key exchange comprises:
    exchanging a public key associated with the first trusted electronic device with the second trusted electronic device; and
    exchanging a public key associated with the second trusted electronic device with the first trusted electronic device.

15. The system of claim 14, wherein transferring at least the portion of the tokenized assets to the second trusted electronic device comprises:
    encrypting at least the portion of the tokenized assets with the public key associated with the first trusted electronic device; and
    transferring the encrypted at least the portion of the tokenized assets with the public key associated with the first trusted electronic device to the second trusted electronic device.

16. The system of claim 10, further comprising:
    determining that an internet connection is available; and
    syncing a value remaining on the first trusted electronic device with the server.

17. The system of claim 10, wherein the at least a portion of the tokenized assets is transferred to the second trusted electronic device using near field data transfer.

18. The system of claim 10, wherein the tokenized asset are transferred to the first trusted electronic device via a wired connection.

19. The system of claim 10, wherein the first trusted electronic device and the second trusted electronic device are trusted tamper-proof devices.

20. A system comprising:
    a first trusted electronic device; and
    a second trusted electronic device, the first trusted electronic device comprising:
    a receiver configured to receive tokenized assets with associated value at a mobile device from a designated server to a mobile device, wherein after the tokenized asset is received, the value quantity is removed from the server; and a transmitter configured to transmit at least a portion of the tokenized assets to the second trusted electronic device such that the portion of the tokenized assets is only stored on the second trusted electronic device after the transfer, wherein the transfer occurs at a time when both first trusted electronic device and the second trusted electronic device are offline.

* * * * *

UNITED STATES PATENT AND TRADEMARK OFFICE
CERTIFICATE OF CORRECTION

PATENT NO. : 11,526,874 B2
APPLICATION NO. : 16/898977
DATED : December 13, 2022
INVENTOR(S) : Varun Reddy Boddu et al.

It is certified that error appears in the above-identified patent and that said Letters Patent is hereby corrected as shown below:

In the Claims

Column 7, In Claim 7 Line 53, 'interact' should be -- internet --.

Column 8, In Claim 18 Line 53, 'asset' should be -- assets --.

Signed and Sealed this
Eleventh Day of April, 2023

Katherine Kelly Vidal
*Director of the United States Patent and Trademark Office*